United States Patent
Kosaka et al.

(10) Patent No.: US 8,011,695 B2
(45) Date of Patent: Sep. 6, 2011

(54) CAR BODY SUBSTRUCTURE

(75) Inventors: Naoya Kosaka, Susono (JP); Koji Tamakoshi, Susono (JP); Takeo Mori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/746,651

(22) PCT Filed: Dec. 5, 2008

(86) PCT No.: PCT/JP2008/072172
§ 371 (c)(1),
(2), (4) Date: Jun. 7, 2010

(87) PCT Pub. No.: WO2009/072614
PCT Pub. Date: Jun. 11, 2009

(65) Prior Publication Data
US 2010/0264637 A1 Oct. 21, 2010

(30) Foreign Application Priority Data
Dec. 7, 2007 (JP) ................................. 2007-317240

(51) Int. Cl.
*B62D 7/22* (2006.01)
(52) U.S. Cl. ...................................................... 280/784
(58) Field of Classification Search ........... 280/124.109, 280/781, 784, 795, 793, 788
See application file for complete search history.

(56) References Cited

U.S. PATENT DOCUMENTS

| 4,327,938 | A | * | 5/1982 | Geissler et al. | 280/784 |
| 6,619,730 | B2 | * | 9/2003 | Porner | 296/204 |
| 7,032,961 | B2 | * | 4/2006 | Matsuda | 296/204 |

FOREIGN PATENT DOCUMENTS

| JP | 5 270435 | 10/1993 |
| JP | 8 133125 | 5/1996 |
| JP | 8 318872 | 12/1996 |
| JP | 2002 321648 | 11/2002 |
| JP | 2003 118632 | 4/2003 |
| JP | 2006 151145 | 6/2006 |
| JP | 2007 118864 | 5/2007 |

* cited by examiner

Primary Examiner — Faye M. Fleming
(74) Attorney, Agent, or Firm — Oblon, Spivak, McClelland, Maier & Neustadt, L.L.P.

(57) ABSTRACT

There is provided an underbody structure capable of exactly distributing and transmitting a front collision load to front and back skeleton portions of an underbody even in a case where the front collision load to be input from the front of a vehicle is concentrated on one side in a vehicle width direction. When a power unit 1 moves rearward due to an offset collision load of a right front face of a vehicle, a right connecting arm 7G of a sub-frame 7, an engine rear mount 7E, and right and left stoppers 7H and 7I receive an offset collision load from the power unit 1, thereby suppressing generation of an unintended rotative force in the power unit 1. The sub-frame 7 distributedly transmits an offset collision load to a rear portion 4A of a right front side member 4, and right and left tunnel reinforcements 5 and 5 mainly through four paths of a right beam 7D, a right load transmission beam 7J2, and right and left load transmission beams 7J3 and 7J4 of an intermediate portion.

15 Claims, 15 Drawing Sheets (a)

(b)

(c)

CAR BODY SUBSTRUCTURE

TECHNICAL FIELD

The present invention relates to an underbody structure, and specifically, to an underbody structure constructed so that a front collision load to be input from the front of a vehicle is transmitted to a plurality of front and back skeleton portions disposed at an underbody.

BACKGROUND ART

In a vehicle which has a power unit arranged at a front portion thereof, the power unit receives a front collision load at the time of front collision, and moves toward a rear vehicle interior, and a front portion of the vehicle interior is crushed due to the rearward movement of the power unit (refer to Patent Citation 1). Particularly, in a case where the types of front collision are offset collision, pole collision, etc. and the front collision load is concentrated on one side in a vehicle width direction, the power unit may be greatly pushed into the rear vehicle interior, and the front portion of the vehicle interior may be greatly crushed.

Thus, in order to suppress deformation of the vehicle interior by the power unit at the time of such front offset collision of the vehicle, various vehicle body structures have conventionally been suggested. For example, a vehicle body structure is suggested in which a pair of stoppers which strike when right and left drive shafts which transmit a driving force to front wheels from the power unit move rearward is provided at a vehicle body frame (refer to Patent Citation 2).
Patent Citation 1: JP-A-8-133125
Patent Citation 2: JP-A-2002-321648

DISCLOSURE OF INVENTION

Technical Problem

Meanwhile, in the vehicle body structure as described in Patent Citation 2, in a case where a front collision load is concentrated on one side in the vehicle width direction like the front offset collision or front pole collision of a vehicle, the collision load is concentrated on the stopper on the collision side, and a rotative force having the stopper as a starting point is generated in the power unit. For this reason, there is a possibility that the front collision load cannot be exactly distributed and transmitted to front and back skeleton portions of a vehicle body, such as side members, side sills, and tunnel reinforcements, which extend in a front-back direction of a vehicle body from the power unit.

Thus, the object of the invention is to provide an underbody structure capable of exactly distributing and transmitting a front collision load to front and back skeleton portions of an underbody even in a case where the front collision load to be input from the front of a vehicle is concentrated on one side in a vehicle width direction.

Technical Solution

An underbody structure related to a first invention of the present application includes a collision load transmission member which receives a front collision load of a vehicle to be input to a power unit disposed at a front portion of the vehicle, and transmits the front collision load to a plurality of front and back skeleton portions disposed at an underbody. Here, the collision load transmission member has at least three load receiving points which receive the front collision load of the vehicle from both side portions and an intermediate portion of the power unit in a vehicle width direction.

In the underbody structure related to the first invention, when a front collision load is input to the power unit at the time of front collision of a vehicle, the collision load transmission member receives the front collision load of the vehicle from both the side portions and the intermediate portion of the power unit in the vehicle width direction at at least three load receiving points. Also, the collision load transmission member exactly distributes and transmits the front collision load received from the power unit to the plurality of front and back skeleton portions of the underbody, without generating an unintended rotative force in the power unit.

In the underbody structure of the first invention, preferably, the collision load transmission member has at least four load transmission points for transmitting a front collision load to at least four front and back skeleton portions disposed at both side portions and an intermediate portion of the underbody in the vehicle width direction. In this case, the collision load transmission member is able to distribute and transmit the front collision load received from the power unit to at least four front and back skeleton portions of the underbody, and is also able to cope with a front offset collision or front pole collision of a vehicle.

In the underbody structure of the first invention, preferably, the collision load transmission member has a plurality of load transmission paths for transmitting a front collision load to two points of at least four load transmission points from each of at least three load receiving points. In this case, the collision load transmission member is able to reliably distribute and transmit the front collision load received from the power unit to at least four front and back skeleton portions of the underbody through a plurality of load transmission paths, and is also able to cope with a front offset collision or front pole collision of a vehicle.

Here, in the underbody structure of the first invention, the collision load transmission member can be constituted as a suspension member or sub-frame of the underbody, and the front and back skeleton portions can be constituted as side members, side sills, and tunnel reinforcements of the underbody.

An underbody structure of a vehicle related to a second invention of the present application includes a suspension member capable of transmitting a collision load to be input from the front of the vehicle rearward. Here, a rear portion of the suspension member is combined with a pair of right and left side members and a pair of right and left tunnel reinforcements at four points of the vehicle in a vehicle width direction.

In the underbody structure related to the second invention, when a front collision load is input to the suspension member from the front of a vehicle at the time of front collision of the vehicle, the suspension member exactly distributes and transmits the collision load to the pair of right and left side members and the pair of tunnel reinforcements of the underbody.

In the underbody structure of the second invention, the suspension member may be in the shape of a face plate, or may be in the shape of a frame which has therein load transmission beams which are developed and extend in the shape of a fan to the front of the vehicle body.

The underbody structure of the second invention may further include a fan-shaped combining member of which a front portion on the side of the suspension member spreads in the vehicle width direction, or a V-shaped combining member of which a front portion on the side of the suspension member opens and branches in the vehicle width direction, as a member which combines a rear portion of the suspension member with at least the tunnel reinforcements.

Here, the fan-shaped or V-shaped combining member preferably has an outer skeleton portion which is formed at an outer portion in the vehicle width direction, and extends in the front-back direction of the vehicle body, and an inner skeleton portion which is formed at an inner portion in the vehicle width direction, and has a front portion extending obliquely toward the inside in the vehicle width direction, and the front portion of the inner skeleton portion preferably extends obliquely forward toward a region covering one side of right and left sides from a central portion of the front portion of the vehicle body in the right-and-left direction.

In this case, when a front collision load of a vehicle is concentrated on one side in the vehicle width direction, the outer skeleton portion of one fan-shaped combining member or V-shaped combining member which is arranged in the vicinity of one side in the vehicle width direction distributes and transmits a front collision load to at least one tunnel reinforcement, and the inner skeleton portion of the other fan-shaped combining member or V-shaped combining member which is arranged in the vicinity of the opposite side in the vehicle width direction distributes and transmits a front collision load to at least an opposite tunnel reinforcement.

Advantageous Effects

According to the underbody structure related to the first invention of the present application, the collision load transmission member receives a front collision load to be input to the power unit from both the side portions of the power unit in the vehicle width direction at least three load receiving points. Therefore, even when a front collision load of a vehicle is concentrated on one side in the vehicle width direction, a front collision load to be input to the power unit can be exactly transmitted to the plurality of front and back skeleton portions of the underbody without generating an unintended rotative force in the power unit, and the rigidity of the front and back skeleton portions can be secured. As a result, it is possible to prevent in advance a situation where the power unit is pushed into a vehicle interior, and a front portion of the vehicle interior is crushed.

Additionally, according to the underbody structure related to the second invention of the present application, the rear portion of the suspension member is combined with the pair of right and left front side members and the pair of right and left tunnel reinforcements of the vehicle body at four points in the vehicle width direction. Therefore, even when a front collision load of a vehicle is concentrated on one side in the vehicle width direction, the front collision load can be exactly distributed and transmitted to the pair of right and left side members and the pair of right and left tunnel reinforcements which are front and back skeleton portions of the underbody from the rear portion of the suspension member, and the rigidity of the front and back skeleton portions can be secured. As a result, it is possible to prevent in advance a situation where a front portion of a vehicle interior is crushed due to a front collision load.

BRIEF DESCRIPTION OF DRAWINGS

FIG. 9A is a sectional view along a line a-a of FIG. 7, FIG. 9B is a sectional view along a line b-b of FIG. 7, and FIG. 9C is a sectional view along a line c-c of FIG. 7.

EXPLANATION OF REFERENCE

1: POWER UNIT
1A: ENGINE
1B: TRANSMISSION
1C: LEFT DRIVE SHAFT
1D: RIGHT DRIVE SHAFT
1E: LEFT LOAD TRANSMISSION PROJECTION
1F: RIGHT LOAD TRANSMISSION PROJECTION
2: FLOOR PANEL
3: SIDE SILL
4: FRONT SIDE MEMBER
4A: REAR PORTION
4B: FRONT PORTION
4C: KICK PORTION
5: TUNNEL REINFORCEMENT
6A: FRONT LEFT WHEEL
6B: FRONT RIGHT WHEEL
7: SUB-FRAME
7A: FRONT CROSS BEAM
7B: REAR CROSS BEAM

7B1 to 7B4: FASTENING BOLT
7C: LEFT BEAM
7D: RIGHT BEAM
7E: ENGINE REAR MOUNT
7F: LEFT CONNECTING ARM,
7G: RIGHT CONNECTING ARM
7H: LEFT STOPPER
7I: RIGHT STOPPER,
7J1: LEFT LOAD TRANSMISSION BEAM
7J2: RIGHT LOAD TRANSMISSION BEAM
7J3: INTERMEDIATE PORTION LEFT LOAD TRANSMISSION BEAM
7J4: INTERMEDIATE PORTION RIGHT LOAD TRANSMISSION BEAM
8: BUMPER REINFORCEMENT
9: SUSPENSION MEMBER
10: LEFT COMBINING MEMBER
11: RIGHT COMBINING MEMBER
12: LEFT COMBINING MEMBER

BEST MODE FOR CARRYING OUT THE INVENTION

The best embodiments of an underbody related to the invention will be described below with reference to the drawings. The underbody structure related to the first embodiment of the invention is constructed so that a front collision load can be reliably transmitted to a plurality of front and back skeleton portions of an underbody when a vehicle is involved in a front collision with structures, such as other vehicles and electric poles. For example, as shown in FIG. 1, a power unit 1 is applied to the vehicle arranged at a vehicle body front portion.

Figure 1:
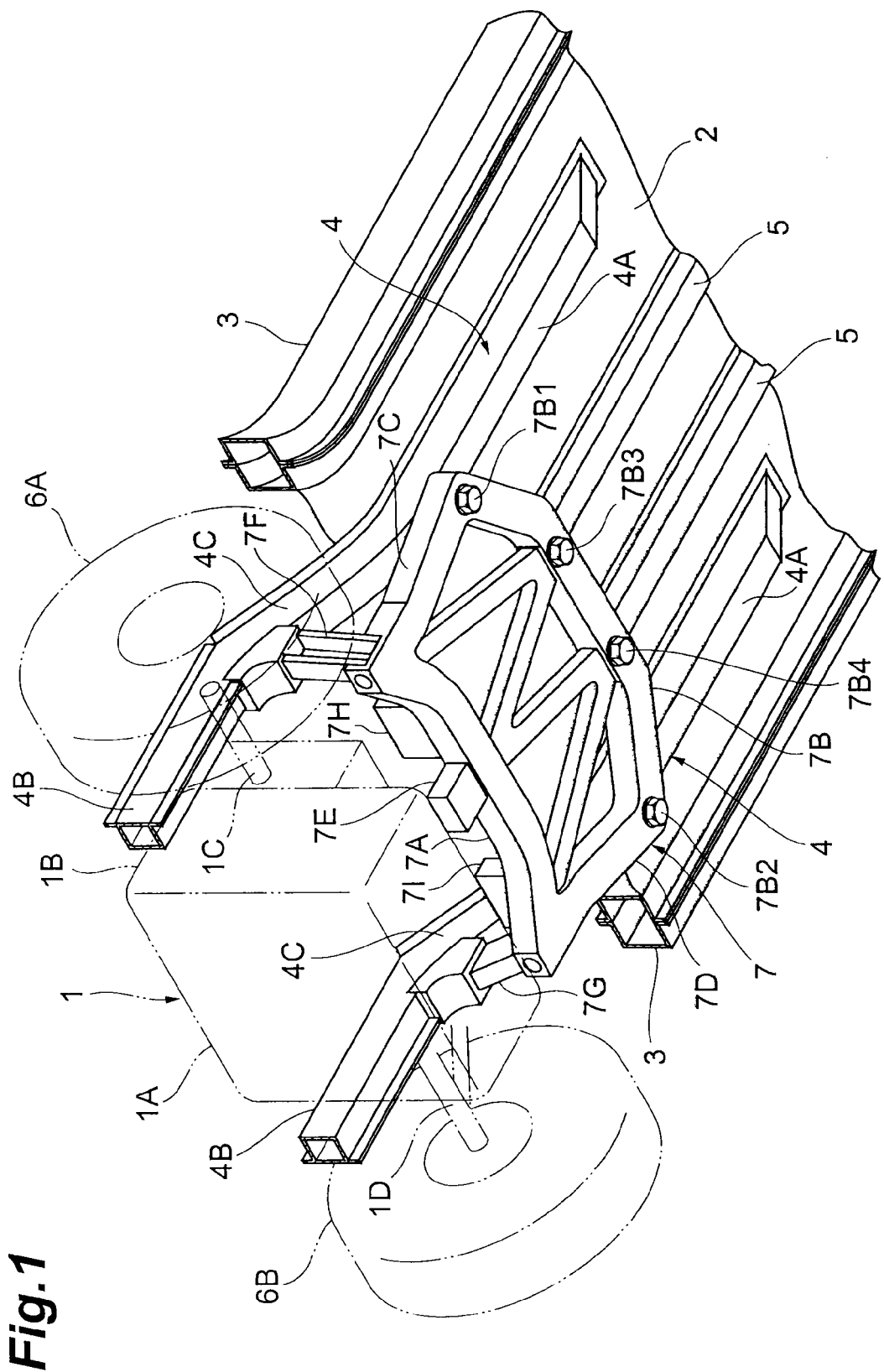
FIG. 1 is a perspective view when an underbody structure related to a first embodiment of the invention is viewed from the front lower side of a vehicle body.
Figure 2:
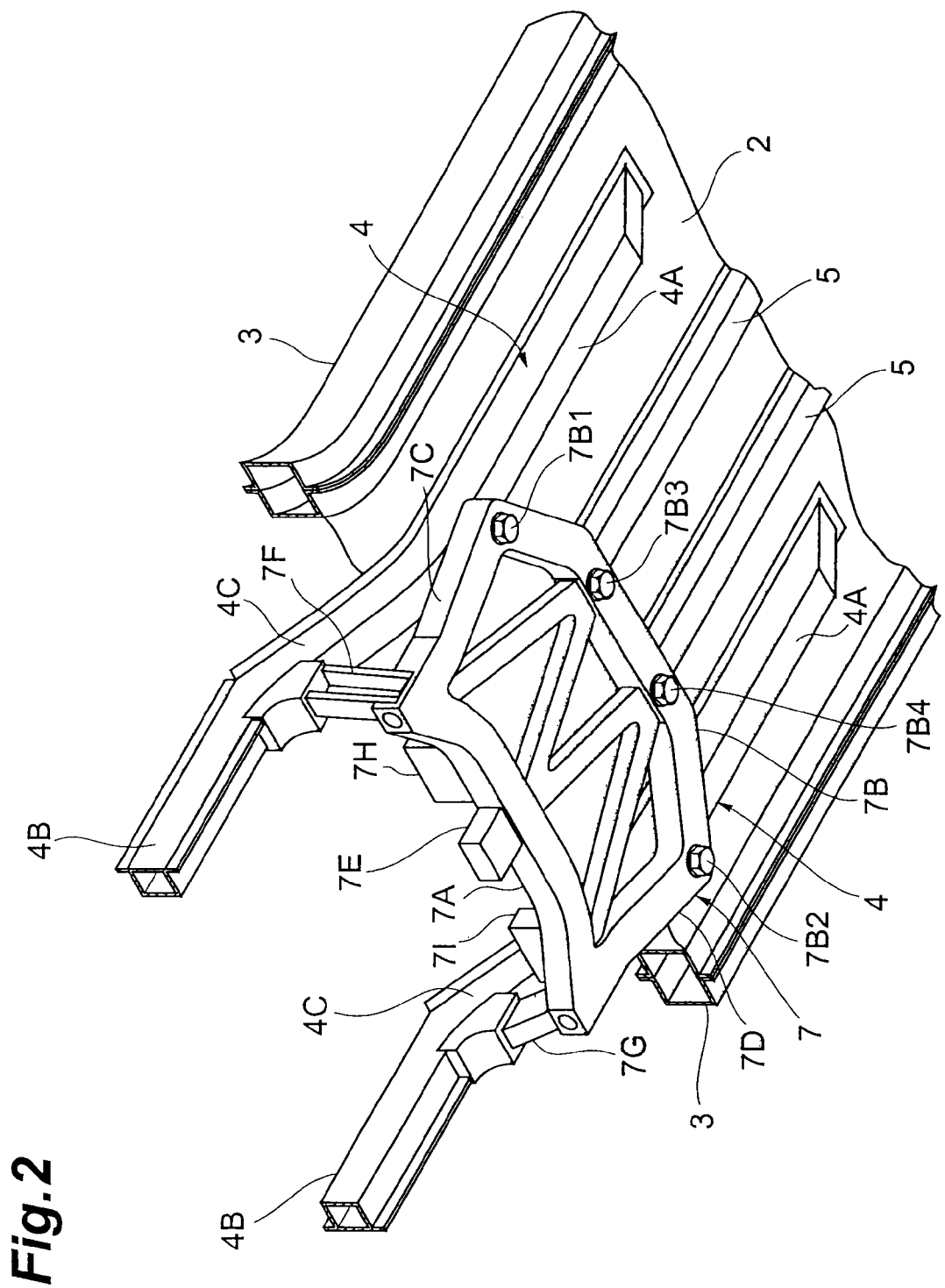
FIG. 2 is a perspective view corresponding to FIG. 1, showing a state where a power unit and wheels which are shown in FIG. 1 are excluded.

Here, as shown in FIGS. 1 and 2, an underbody structure of a first embodiment includes, as front and back skeleton portions, a pair of right and left side sills 3 and 3, a pair of right and left front side members 4 and 4, and a pair of right and left tunnel reinforcements 5 and 5 which are respectively combined with a floor panel 2 which constitutes a lower portion of a vehicle interior, and have a closed section structure which extends in a front-back direction of the vehicle body.

The two right and left side sills 3 and 3 are combined with both side portions of the floor panel 2 in a vehicle width direction (right-and-left direction of the vehicle body), and reinforce the portions. Additionally, the two right and left tunnel reinforcements 5 and 5 are combined with the bottom surface of an intermediate portion of the floor panel 2 in the vehicle width direction, and reinforce the portion. Also, the rear portions 4A and 4A of the two right and left front side members 4 and 4 are arranged between the side sills 3 and 3 and the tunnel reinforcements 5 and 5, and are combined with the bottom surface of a front portion of the floor panel 2.

Here, front side members 4 and 4 are such that front portions 4B and 4B which protrude forward from the rear portions 4A and 4A combined with the floor panel 2 are located above the rear portions 4A and 4A, and intermediate kick portions 4C and 4C incline toward the front upper side from the rear portions 4A and 4A.

Meanwhile, the power unit 1 has a transmission 1B which is integrally incorporated into an engine 1A of a transversely mounted type in which a crankshaft (not shown) faces the vehicle width direction, and is arranged between the front portions 4B and 4B of the front side members 4 and 4.

A left drive shaft 1C which protrudes to the left from a rear portion of the transmission 1B and drives a front left wheel 6A, and a right drive shaft 1D which protrudes to the right from the rear portion of the transmission 1B and drives a front right wheel 6B are arranged directly behind the main body of the power unit 1 (refer to FIG. 1).

Here, the underbody structure of the first embodiment includes, as a collision load transmission member, a sub-frame (suspension member) 7 which is constructed so as to receive a front collision load to be input to the power unit 1 during a front collision of the vehicle, and transmit the front collision load to the front side members 4 and 4 and tunnel reinforcements 5 and 5 which are front and back skeleton portions.

Figure 3:
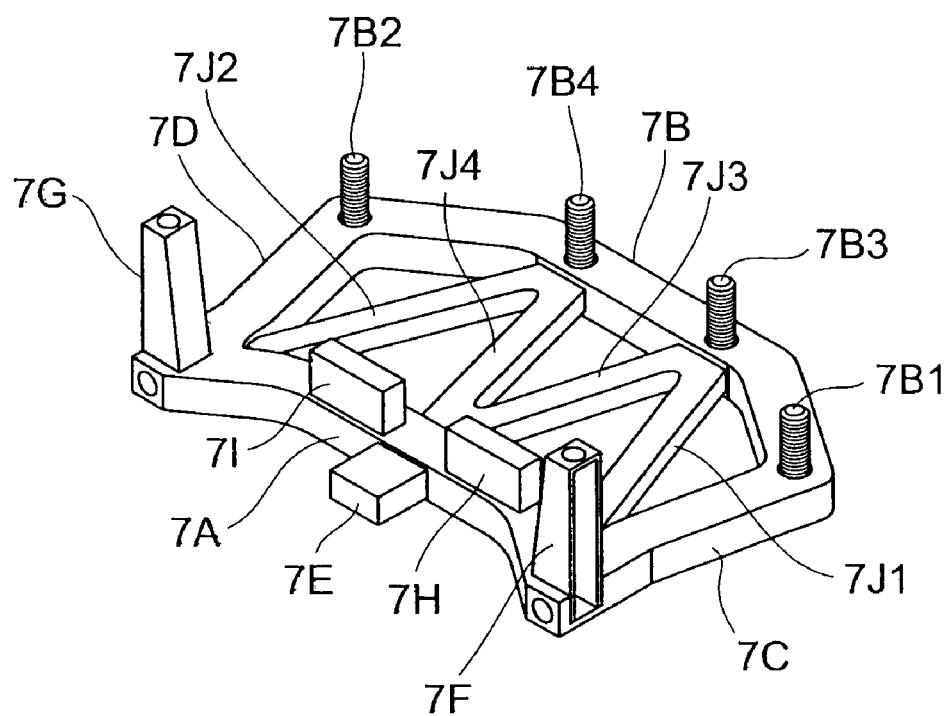
FIG. 3 is a perspective view when a sub-frame serving as a collision load transmission member shown in FIGS. 1 and 2 is viewed from the front upper side.

The sub-frame 7 is formed in the shape of a transversely long frame as illustrated in FIGS. 1 to 3, and has a front cross beam 7A, a rear cross beam 7B, a left beam 7C, and a right beam 7D, which are formed in a closed section, respectively. A left lower arm (not shown) which constitutes a suspension device of the front left wheel 6A is pivotally supported on the left beam 7C of the sub-frame 7, and a right lower arm (not shown) which constitutes a suspension device of the front right wheel 6B is pivotally supported on the right beam 7D.

Additionally, an engine rear mount 7E for supporting the rear portion of the power unit 1 is provided so as to protrude forward near a central portion of the front cross beam 7A of the sub-frame 7 in the vehicle width direction (refer to FIG. 1). Also, the power unit 1 is supported at three points including the engine rear mount 7E, and right and left engine side mounts (not shown) provided at the front portions 4B and 4B of the right and left front side members 4 and 4.

Here, a pair of right and left connecting arms 7F and 7G which rises upward from both the right and left ends of the front cross beam, and has upper ends fastened to the vicinities of rear portions of the front portions 4B and 4B of the front side members 4 and 4, and a pair of right and left stoppers 7H and 7I which is arranged between the connecting arms 7F and 7G and the engine rear mount 7E, and protrudes upward are formed integrally with the front cross beam 7A of the sub-frame 7.

The pair of right and left connecting arms 7F and 7G is respectively arranged so as to face portions immediately after right and left drive shafts 1C and 1D which protrude from the rear portion of the transmission 1B of the power unit 1, and constitutes two load receiving points which receive a front collision load of the vehicle from both the side portions of the power unit 1 in the vehicle width direction.

Additionally, the pair of right and left stoppers 7H and 7I is respectively arranged so as to face immediately behind the main body of the power unit 1, and constitute two load receiving points which receive a front collision load of the vehicle from an intermediate portion of the power unit 1 in the vehicle width direction. Also, the engine rear mount 7E which supports the rear portion of the power unit 1 constitutes other load receiving points which receive a front collision load of the vehicle from the intermediate portion of the power unit 1 in the vehicle width direction (refer to FIG. 1).

Meanwhile, the rear cross beam 7B of the sub-frame 7 has both right and left ends which are respectively fastened to the front portions of the rear portions 4A and 4A of the front side members 4 and 4 via a pair of right and left fastening bolts 7B1 and 7B2, and has an intermediate portion fastened to the front portions of the tunnel reinforcements 5 and 5 via a pair of right and left fastening bolt 7B3 and 7B4. Also, the fastening bolts 7B1 to 7B4 constitute four load transmission points for transmitting a front collision load of the vehicle to be input to the sub-frame 7 to four front and back skeleton portions of the underbody from the power unit 1.

Here, four load transmission beams 7J1 to 7J4, which are developed to extend in the shape of a fan to the front of the vehicle body, are integrally formed between the front cross beam 7A and rear cross beam 7B of the sub-frame 7 so as to form a W-shape in plan view. Among these beams, a left load transmission beam 7J1 is laid between the vicinity of a left end of the front cross beam 7A and the vicinity of a fastened portion of the rear cross beam 7B by the fastening bolt 7B3 so as to constitute a load transmission path for transmitting a front collision load, which is to be input to the vicinity of the left connecting arm 7F from the power unit 1, to the left tunnel reinforcement 5.

Similarly, a right load transmission beam 7J2 is laid between the vicinity of a right end of the front cross beam 7A and the vicinity of a fastened portion of the rear cross beam 7B by the fastening bolt 7B4 so as to constitute a load transmission path for transmitting a front collision load, which is to be input to the vicinity of the right connecting arm 7G from the power unit 1, to the right tunnel reinforcement 5.

Meanwhile, a left load transmission beam 7J3 of the intermediate portion is laid between the vicinity of an intermediate portion of the front cross beam 7A and the vicinity of a fastened portion of the rear cross beam 7B by the fastening bolt 7B3 so as to constitute a load transmission path for transmitting a front collision load, which is to be input to the vicinity of the engine rear mount 7E from the power unit 1, to the left tunnel reinforcement 5.

Similarly, a right load transmission beam 7J4 of the intermediate portion is laid between the vicinity of the intermediate portion of the front cross beam 7A and the vicinity of a fastened portion of the rear cross beam 7B by the fastening bolt 7B4 so as to constitute a load transmission path for transmitting a front collision load, which is to be input to the vicinity of the engine rear mount 7E from the power unit 1, to the right tunnel reinforcement 5.

Here, the left beam 7C of the sub-frame 7 constitutes the load transmission path along which a front collision load to be input to the vicinity of the left connecting arm 7F from the power unit 1 is transmitted to the rear portion 4A of the left front side member 4 via the fastening bolt 7B1. Similarly, the right beam 7D of the sub-frame 7 constitutes the load transmission path along which a front collision load to be input to the vicinity of the right connecting arm 7G from the power unit 1 is transmitted to the rear portion 4A of the right front side member 4 via the fastening bolt 7B2.

For this reason, a front collision load to be input to the vicinity of the left connecting arm 7F from the power unit 1 is distributed and transmitted to the rear portion 4A of the left front side member 4 via the fastening bolt 7B1 through the path of the left beam 7C, and is distributed and transmitted to the left tunnel reinforcement 5 via the fastening bolt 7B3 through the path of the left load transmission beam 7J1.

Similarly, a front collision load to be input to the vicinity of the right connecting arm 7G from the power unit 1 is distributed and transmitted to the rear portion 4A of the right front side member 4 via the fastening bolt 7B2 through the path of the right beam 7D, and is distributed and transmitted to the right tunnel reinforcement 5 via the fastening bolt 7B4 through the path of the right load transmission beam 7J2.

Additionally, a front collision load to be input to the vicinity of the engine rear mount 7E from the power unit 1 is distributed and transmitted to the left tunnel reinforcement 5 via the fastening bolt 7B3 through the path of the left load transmission beam 7J3 of the intermediate portion, and is distributed and transmitted to the right tunnel reinforcement 5 via the fastening bolt 7B4 through the path of the right load transmission beam 7J4 of the intermediate portion.

In the underbody structure of the first embodiment constructed as described above, when the front of a vehicle collides with other vehicles, etc., and a front collision load is input to the power unit 1 and the power unit 1 moves rearward, the engine rear mount 7E of the sub-frame 7 receives a front collision load input from the intermediate portion of the power unit 1 in the vehicle width direction as a load receiving point.

Then, when the power unit 1 further moves rearward, the right and left drive shafts 1C and 1D collide with the pair of right and left connecting arms 7F and 7G of the sub-frame 7, whereby the connecting arms 7F and 7G receive a front collision load input from both the side portions of the power unit 1 in the vehicle width direction as load receiving points.

Additionally, the intermediate portion of the power unit 1 in the vehicle width direction collides with the pair of right and left stoppers 7H and 7I of the sub-frame 7, whereby the stoppers 7H and 7I receive a front collision load input from the intermediate portion of the power unit 1 in the vehicle width direction as a load receiving point. For this reason, generation of an unintended rotative force in the power unit 1 is suppressed.

Here, a front collision load to be input to the engine rear mount 7E and stoppers 7H and 7I of the sub-frame 7 is distributed and transmitted to the right and left tunnel reinforcements 5 and 5 via the fastening bolts 7B3 and 7B4 through the paths of the right and left load transmission beams 7J3 and 7J4 of the intermediate portion from the central portion of the front cross beam 7A in the width direction.

Additionally, a front collision load to be input to the left connecting arm 7F of the sub-frame 7 is distributed and transmitted to the rear portion 4A of the left front side member 4 via the fastening bolt 7B1 through the path of the left beam 7C, and is distributed and transmitted to the left tunnel reinforcement 5 via the fastening bolt 7B3 through the path of the left load transmission beam 7J1.

Similarly, a front collision load to be input to the right connecting arm 7G of the sub-frame 7 is distributed and transmitted to the rear portion 4A of the right front side member 4 via the fastening bolt 7B2 through the path of the right beam 7D, and is distributed and transmitted to the right tunnel reinforcement 5 via the fastening bolt 7B4 through the path of the right load transmission beam 7J2.

Figure 4:
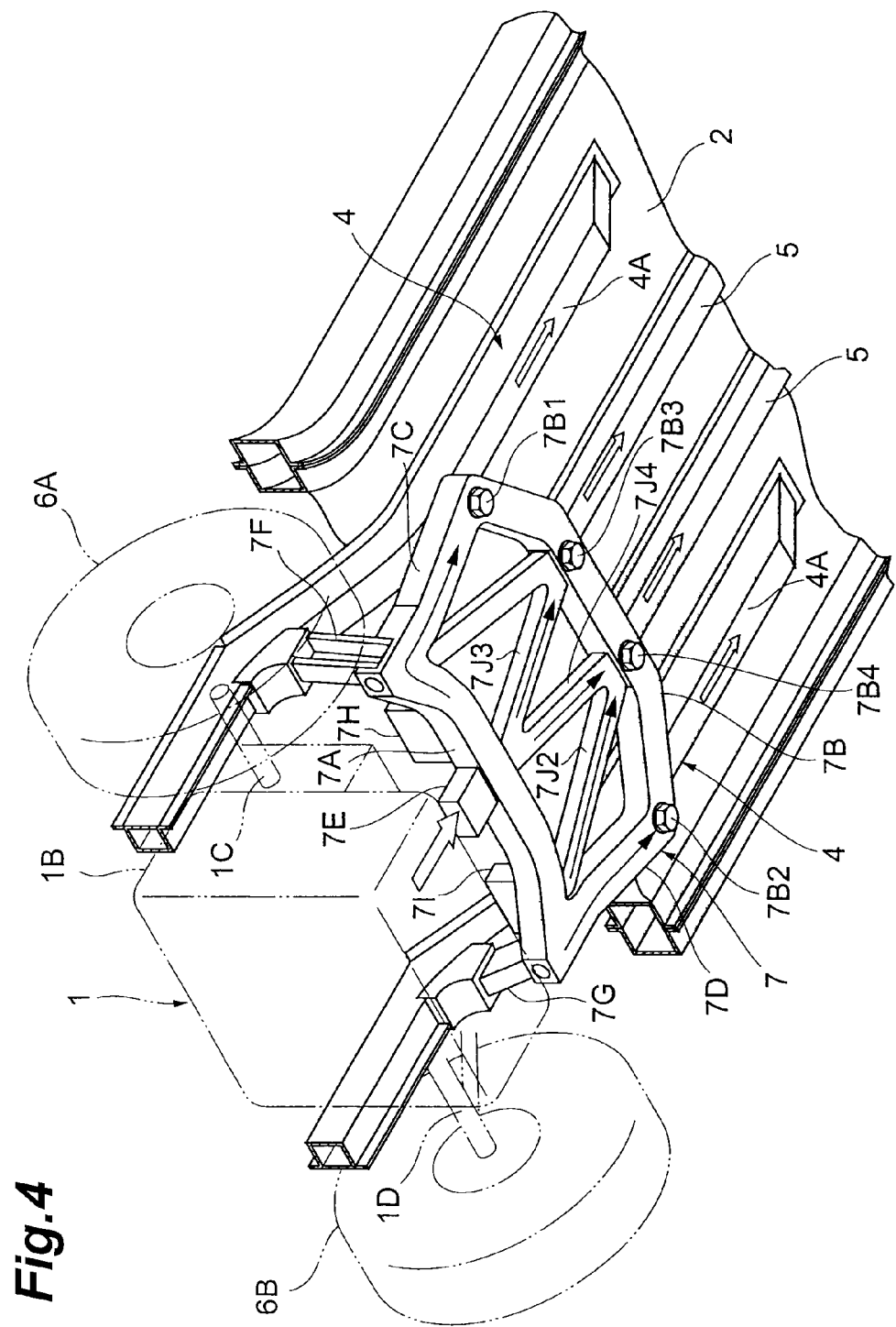
FIG. 4 is a perspective view corresponding to FIG. 1, showing a transmission situation of a front offset collision load of a vehicle caused by the underbody structure related to one embodiment.
Figure 5:
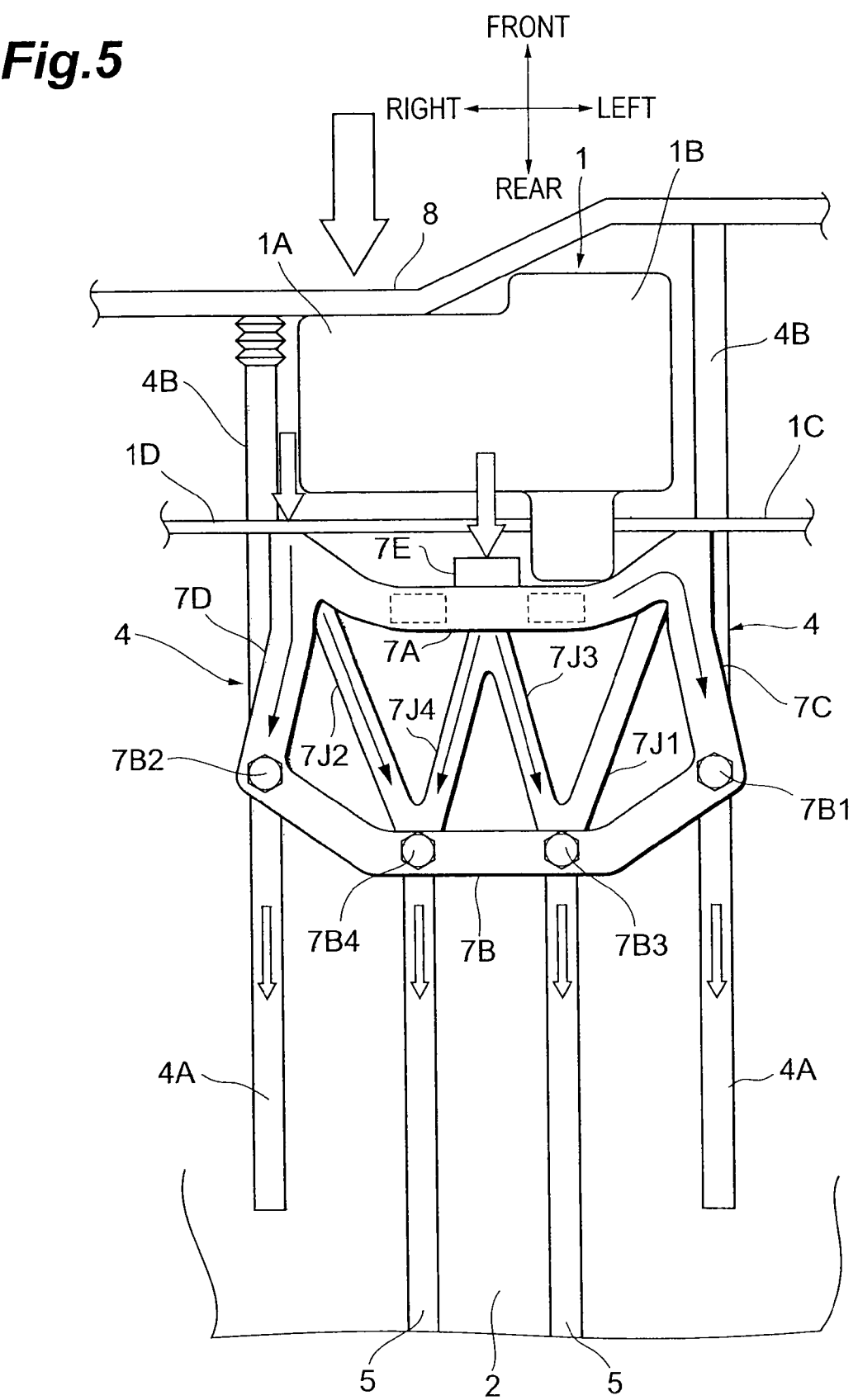
FIG. 5 is a bottom view of the underbody structure when the transmission situation of the front offset collision load of the vehicle shown in FIG. 4 is viewed from the lower side of the vehicle body.

Here, for example, as shown in FIGS. 4 and 5, in a case where the right front face of a vehicle is involved in an offset collision with other vehicles or road structure objects, such as poles, and the power unit 1 moves rearward along with the bumper reinforcement 8, the offset collision load of the right front face to be input to the sub-frame 7 from the power unit 1 is concentrated on the right connecting arm 7G, the engine rear mount 7E, and the right and left stoppers 7H and 7I. Even in this case, however, generation of an unintended rotative force in the power unit 1 is suppressed.

Also, the offset collision load of the right front face to be input to the right connecting arm 7G is distributed and transmitted to the rear portion 4A of the right front side member 4 and the right tunnel reinforcement 5 through two paths of the right beam 7D and right load transmission beam 7J2.

Additionally, the offset collision load of the right front face to be input to the central portion of the front cross beam 7A in the width direction from the engine rear mount 7E and the right and left stoppers 7H and 7I is distributed and transmitted to the right and left tunnel reinforcements 5 and 5 mainly through two paths of the left load transmission beam 7J3 and right load transmission beam 7J4 of the intermediate portion. In such a case, a portion of the offset collision load of the right front face to be input to the front cross beam 7A is also transmitted to the rear portion 4A of the left front side member 4 through the path of the left beam 7C.

Accordingly, according to the underbody structure of the first embodiment, even in a case where a front collision load of a vehicle is concentrated on, for example, the right in the vehicle width direction, a front collision load to be input to the power unit 1 can be distributedly and reliably transmitted to four front and back skeleton portions of the underbody, i.e., to the right and left tunnel reinforcements 5 and 5 and the rear portions 4A and 4A of the right and left front side members 4 and 4, without generating an unintended rotative force in the power unit 1.

Also, the right and left tunnel reinforcements 5 and 5 and the rear portions 4A and 4A of the right and left front side members 4 and 4 which are four front and back skeleton portions receive a front collision load to be input to the power unit 1 in cooperation with each other. As a result, it is possible to prevent a situation where the power unit 1 is pushed into a vehicle interior and the front portion of the vehicle interior is crushed.

Additionally, since the front collision load of the right and left tunnel reinforcements 5 and 5 and the right and left front side members 4 and 4 to which the front collision load of a vehicle is distributed and transmitted decreases, weight reduction, such as thinning, is possible.

In addition, since a case where the left front face of a vehicle makes an offset collision and a front collision load is concentrated on the left in the vehicle width direction is the same as the case where the right front face of the vehicle makes an offset collision and a front collision load is concentrated on the right in the vehicle width direction, the description thereof is omitted.

Here, in the underbody structure of the first embodiment, for example, the number of the tunnel reinforcements 5 arranged between the rear portions 4A and 4A of the right and left front side members 4 and 4, i.e. the tunnel reinforcements 5 fastened to the rear cross beam 7B of the sub-frame 7 is not limited to two, but may be three.

Additionally, the rear cross beam 7B of the sub-frame 7 can, by fastening also to the right and left side sills 3 and 3, be configured so that a front collision load of a vehicle can be distributed and transmitted also to the right and left side sills 3 and 3.

Figure 6:
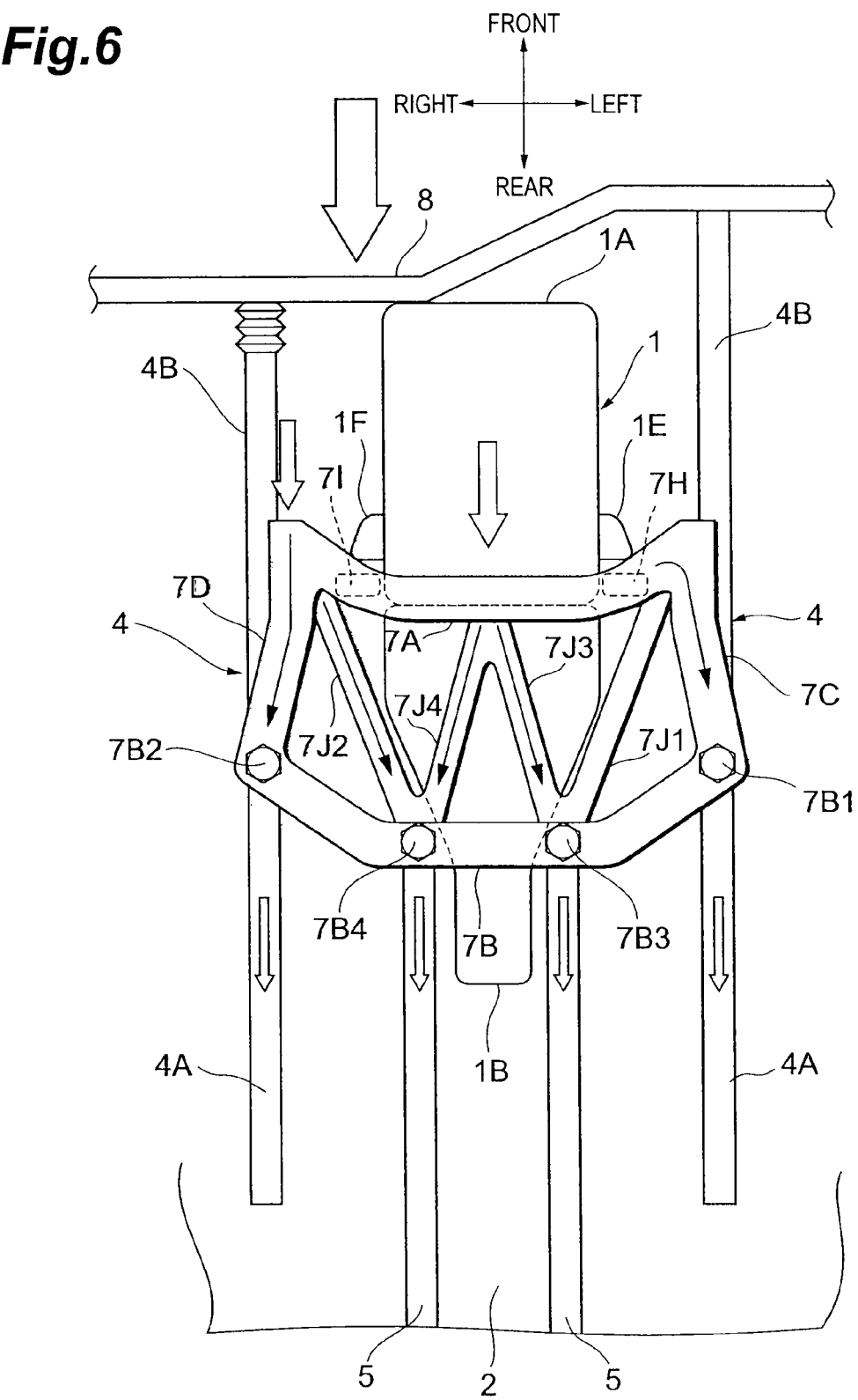
FIG. 6 is a bottom view corresponding to FIG. 5, showing a modification of the first embodiment in which a power unit of the transversely mounted engine type shown in FIG. 5 is changed into a power unit of a longitudinally mounted engine type.

Moreover, the power unit 1 can be changed into, for example, the power unit 1 of a longitudinally mounted engine type as shown in FIG. 6, i.e., the power unit 1 in which the transmission 1B is integrally incorporated into the rear portion of a longitudinally mounted type engine 1A in which a crankshaft (not shown) faces the front-back direction of the vehicle body.

In this case, the pair of right and left stoppers 7H and 7I of the sub-frame 7 are arranged at positions facing the right and left side surfaces of the engine 1A. Correspondingly, a pair of right and left load transmission projections 1E and 1F which can transmit a front collision load of a vehicle to the stoppers 7H and 7I as the projections come into contact with the pair of right and left stoppers 7H and 7I is provided so as to protrude from the right and left side surfaces of the engine 1A.

In the underbody structure including the power unit 1 of such a longitudinally mounted type, for example, when the right front face of a vehicle makes an offset collision and the power unit 1 moves rearward, the load transmission projections 1E and 1F which are provided so as to protrude from the right and left side surfaces of the engine 1A collide with the pair of right and left stoppers 7H and 7I on the side of the sub-frame 7, whereby generation of an unintended rotative force in the power unit 1 is suppressed.

The offset collision load of the right front face input to the power unit 1 is transmitted to the front cross beam 7A from the pair of right and left stoppers 7H and 7I of a sub-frame 7. Here, the offset collision load which is concentrated on the right stopper 7I is distributed and transmitted to the rear portion 4A of the right front side member 4 and the right tunnel reinforcement 5 mainly through two paths of the right beam 7D and right load transmission beam 7J2 from the front cross beam 7A.

Additionally, the offset collision load of the right front face to be input to the central portion of the front cross beam 7A in the width direction is distributed and transmitted to the right and left tunnel reinforcements 5 and 5 mainly through two paths of the left load transmission beam 7J3 and right load transmission beam 7J4 of the intermediate portion. In such a case, a portion of the offset collision load is also transmitted to the rear portion 4A of the left front side member 4 through the path of the left beam 7C.

Accordingly, even by the underbody structure as shown in FIG. 6, a front collision load to be input to the power unit 1 can be distributedly and reliably transmitted to four front and back skeleton portions of the underbody, i.e., to the right and left tunnel reinforcements 5 and 5 and the rear portions 4A and 4A of the right and left front side members 4 and 4, without generating an unintended rotative force in the power unit 1.

Next, an underbody structure related to a second embodiment of the invention will be described with reference to FIGS. 7 to 11. The underbody structure of this second embodiment is obtained by changing the sub-frame (suspension member) 7 in the underbody structure of the first embodiment shown in FIG. 1 into a face-plate-shaped suspension member (sub-frame) 9 as shown in FIG. 7, and adding a left combining member 10 and a right combining member 11 for combining a rear portion of the suspension member 9 with front and back skeleton portions of an underbody.

In addition, other structural portions in the underbody structure of the second embodiment are the same as those of the underbody structure of the first embodiment. Thus, in the following description, the same structural portions are designated by the same reference numerals as the reference numerals used for the description of the first embodiment, and detailed description thereof is omitted.

Figure 7:
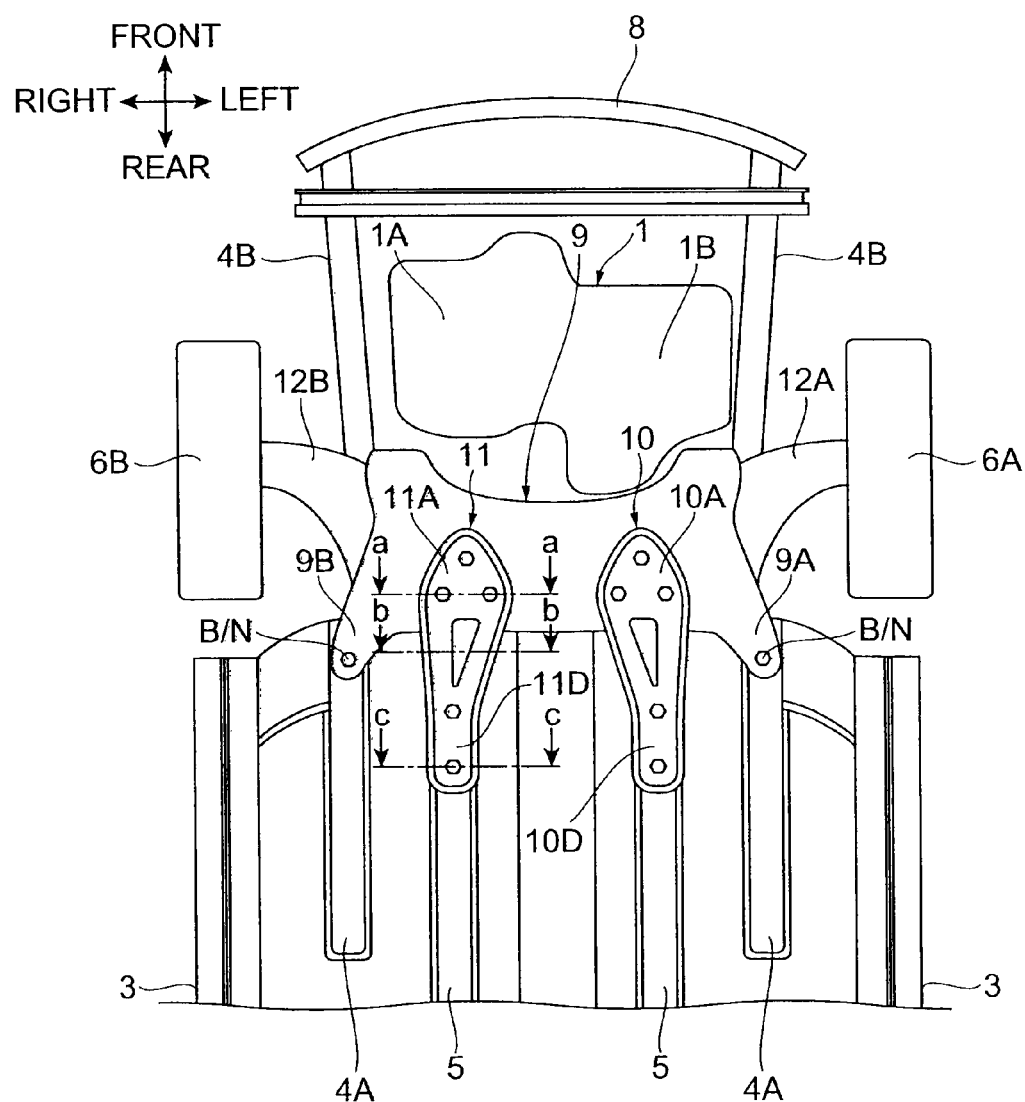
FIG. 7 is a bottom view when an underbody structure related to a second embodiment of the invention is viewed from the lower side of the vehicle body.

The suspension member 9 is constructed as a structure with a hollow cross-section which has an oblong face-plate shape as shown in FIG. 7, and has a left lower arm 12A which constitutes a suspension device of the front left wheel 6A pivotally supported on a left portion thereof, and a right lower arm 12B which constitutes a suspension device of the front right wheel 6B pivotally supported on a right portion thereof.

Figure 8:
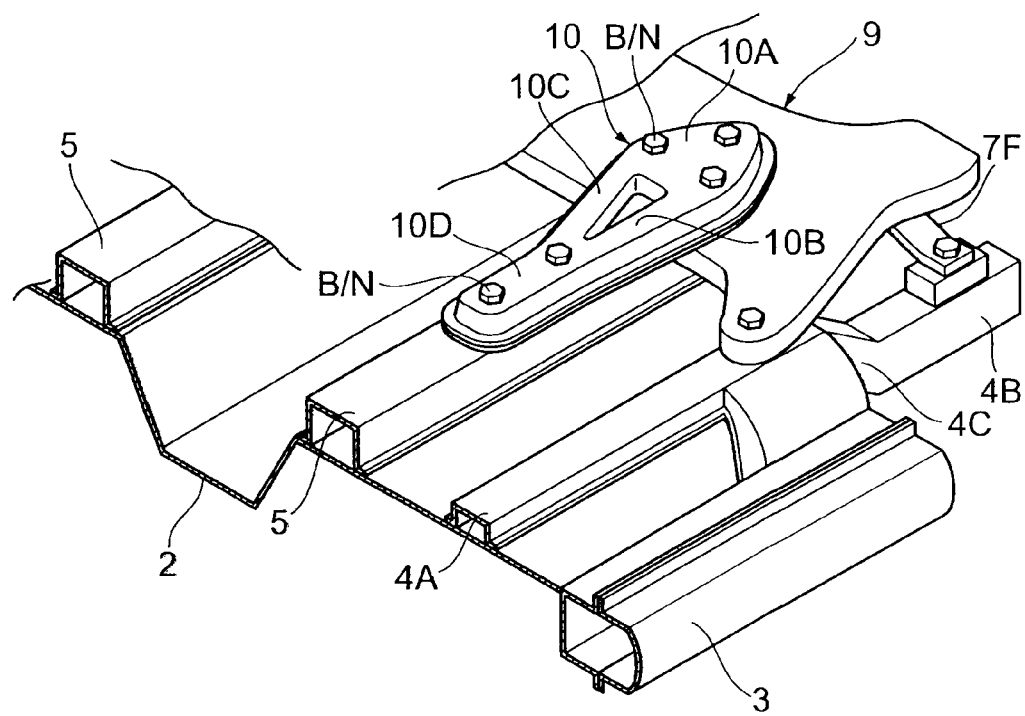
FIG. 8 is a partial perspective view when a left combining member shown in FIG. 7 is viewed from the lower side of the vehicle body.
Figure 9:
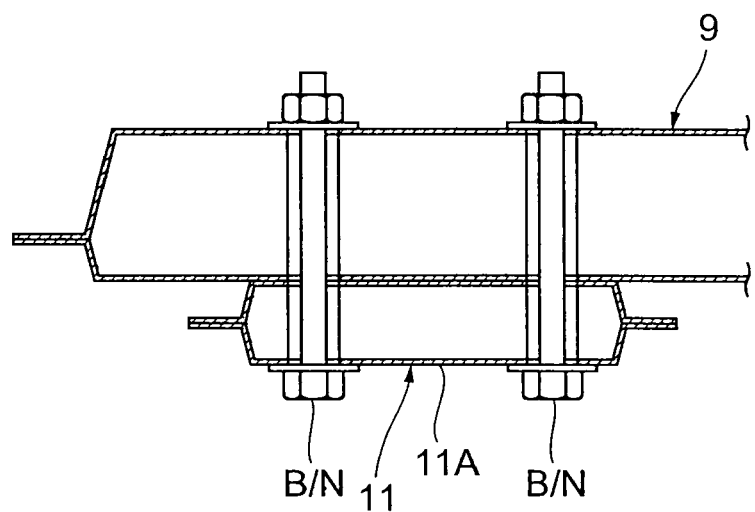
FIGS. 9A to 9C are sectional views of right combining member shown in FIG. 7.
Figure 9:
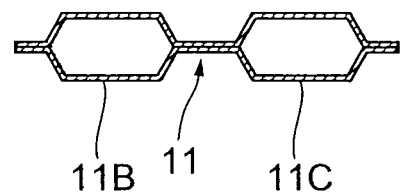
Figure 9:
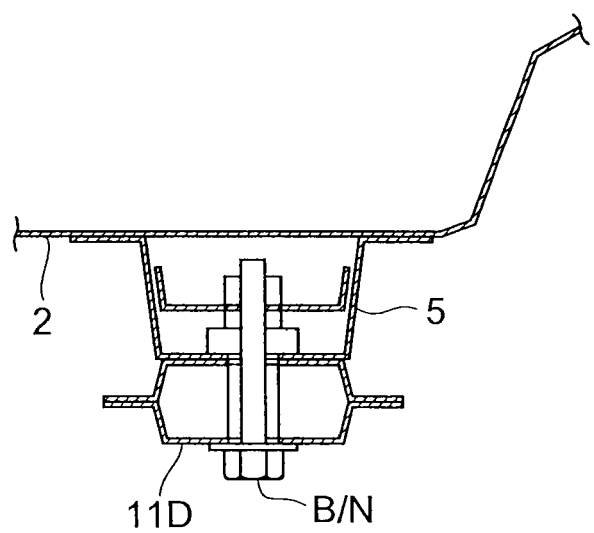

A front portion of the suspension member 9 is connected to the right and left front side members 4 and 4 via a pair of right and left connecting arms. For example, as shown in FIG. 8, a left front portion of the suspension member 9 is connected to the vicinity of a rear portion of the front portion 4B of the left front side member 4 via the left connecting arm 7F. In addition, a right front portion of the suspension member 9 is similarly connected to the vicinity of a rear portion of the front portion of the right front side member 4 via a right connecting arm (not shown).

The rear portion of the suspension member 9 is formed with a pair of right and left fastened portions 9A and 9B which spreads and protrudes obliquely rearward from right and left ends thereof. Also, the left fastened portion 9A and the right fastened portion 9B are respectively fastened to front portions of the rear portions 4A and 4A of the front side members 4 and 4 via a bolt/nut B/N.

Additionally, as shown in FIG. 7, the portion between the left fastened portion 9A and the right fastened portion 9B at the rear portion of the suspension member 9 is combined with the right and left tunnel reinforcements 5 and 5 via the pair of left combining member 10 and the right combining member 11. In this way, the rear portion of the suspension member 9 is combined with the pair of right and left front side members 4 and 4 and the pair of right and left tunnel reinforcements 5 and 5 of the vehicle body at four points in the vehicle width direction.

Here, the pair of left combining member 10 and right combining member 11 is formed in the shape of a bilaterally symmetric long plate which has a hollow cross-section, and the shape of the bottom surface thereof as seen from the lower side of the vehicle body is a narrow fan shape of which the right-and-left width slightly increases in the vehicle width direction toward the front portion on the side of the suspension member 9 from the rear portion on the side of tunnel reinforcements 5 and 5. In addition, the left combining members 10 and right combining member 11 may not necessarily be constructed so as to be bilaterally symmetric with respect to each other.

FIGS. 9A to 9C show the cross-sectional shape of the right combining member 11 arranged on the left of FIG. 7. A front end of the right combining member 11 is formed with a wide hollow cross-sectional portion as shown in FIG. 9A which serves as a front skeleton portion 11A, an intermediate portion thereof in the front-back direction is formed with two hollow cross-sectional portions which are divided into right and left portions as shown in FIG. 9B and serve as an outer skeleton portion 11B and an inner skeleton portion 11C, and a rear end thereof is formed with a narrow hollow cross-sectional portion as shown in FIG. 9C which serves as a rear skeleton portion 11D.

Figure 10:
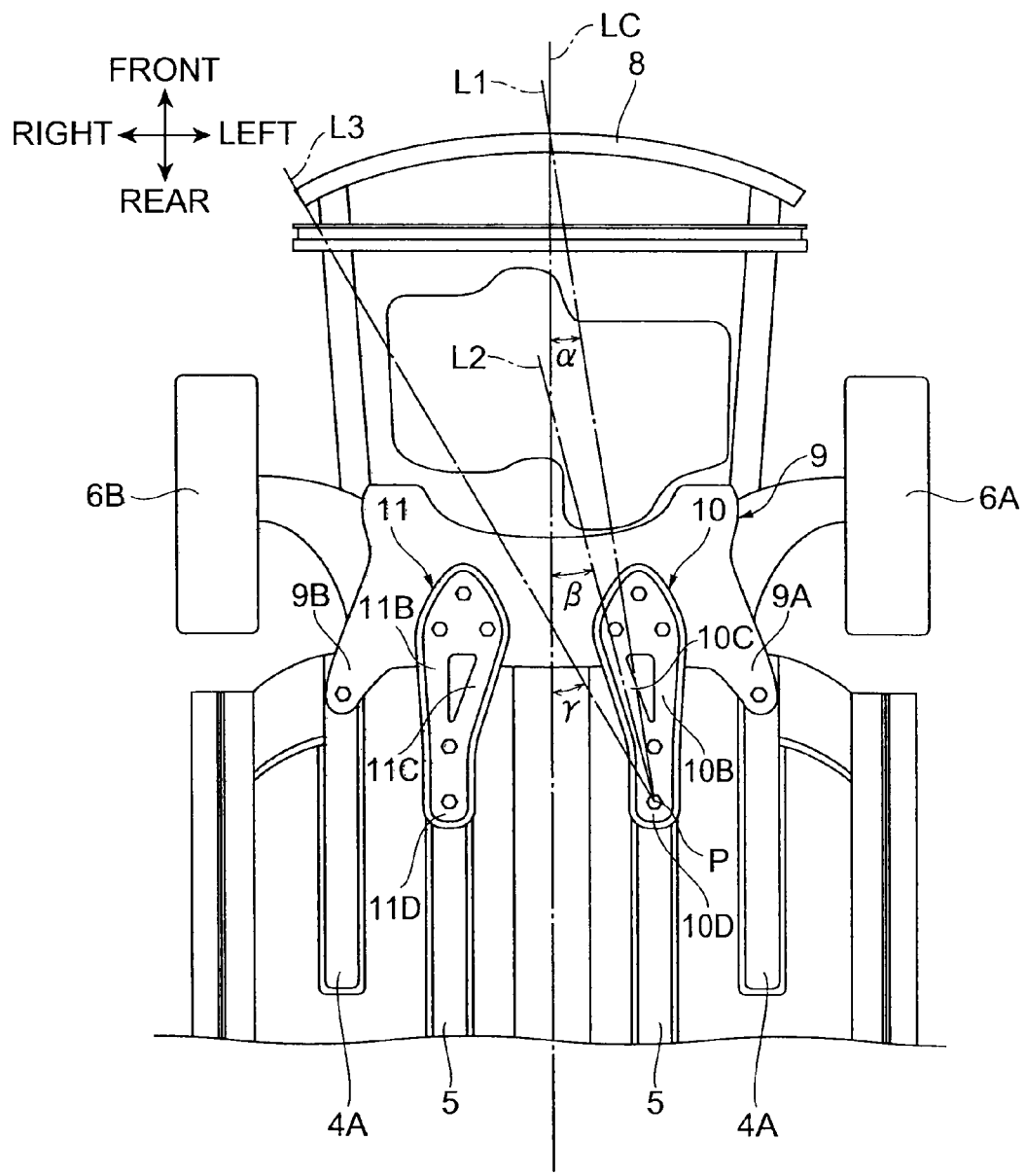
FIG. 10 is a bottom view corresponding to FIG. 7, illustrating an inclination state of an inner skeleton portion of the left combining member shown in FIG. 7.

As shown in FIG. 10, the outer skeleton portion 11B of the right combining member 11 is formed at an outer portion in the vehicle width direction, and extends obliquely along the front-back direction of the vehicle body. Meanwhile, the inner skeleton portion 11C of the right combining member 11 is formed at an inner portion in the vehicle width direction, and a front portion thereof extends toward the inside in the vehicle width direction. In addition, the outer skeleton portion 10B and the inner skeleton portion 10C corresponding to the outer skeleton portion 11B and inner skeleton portion 11C of the right combining member 11 are formed also in the left combining member 10 which is formed bilaterally symmetrically with respect to the right combining member 11.

Here, a front portion of the inner skeleton portion 10C of the left combining member 10 extends obliquely forward toward a region ranging from a central portion of the bumper reinforcement 8 in the right-and-left direction which constitutes the front portion of the vehicle body to a right end thereof. Here, a front portion of the inner skeleton portion 11C of the right combining member 11 extends obliquely forward toward a region ranging from a central portion of the bumper reinforcement 8 in the right-and-left direction to a right end thereof.

In this state, for example, when a point of combination with the tunnel reinforcement 5 of the rear end of the left combining member 10 is defined as P, the centerline of the vehicle body in the right-and-left direction is defined as LC, a line segment which connects the combining point P with the central portion of bumper reinforcement 8 in the right-and-left direction is defined as L1, a line segment along the axial direction of the inner skeleton portion 10C is defined as L2, a line segment which connects the combining point P with a right end of the bumper reinforcement 8 is defined as L3, the intersecting angle of the line segment L1 with respect to the centerline LC is defined as $\alpha$, the intersecting angle of the line segment L2 with respect to the centerline is defined as $\beta$, and the intersecting angle of the line segment L3 with respect to the centerline is defined as $\gamma$, the relationship of $\alpha<\beta<\gamma$ is established. In addition, the same relationship is established also in the right combining member 11.

Figure 11:
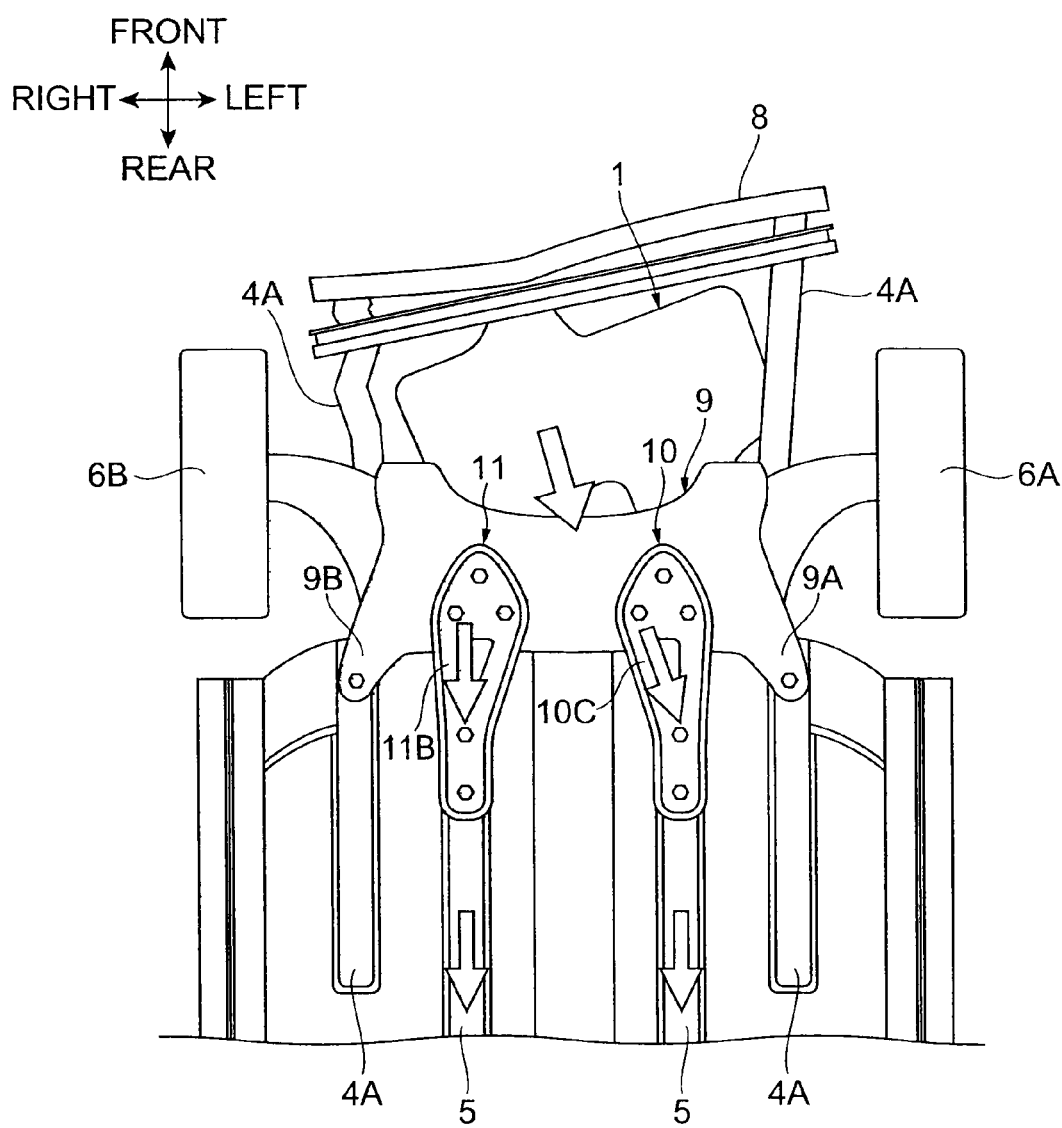
FIG. 11 is a bottom view corresponding to FIG. 7, when a transmission situation of a front collision load in the underbody structure of the second embodiment is viewed from the lower side of the vehicle body.

In the underbody structure of the second embodiment constructed as described above, when a front collision load is input to the power unit 1 from the right front portion of a vehicle, for example, as shown in FIG. 11 at the time of the front collision of the vehicle, and the power unit 1 collides with the suspension member 9 while being rotationally displaced counterclockwise on the plane of sheet of FIG. 11, the suspension member 9 exactly distributes and transmits a front collision load, which is to be obliquely input to the central portion of the front portion in the right-and-left direction like a white arrow, to the underbody in the right-and-left direction from the rear portion.

That is, the suspension member 9 transmits a collision load, which is to be obliquely input toward the rear right from the front left of a vehicle like a white arrow, to the rear portions 4A and 4A of the right and left front side members 4 and 4 via the left fastened portion 9A and the right fastened portion 9B, and transmits the collision load to the right and left tunnel reinforcements 5 and 5 via the left combining member 10 and the right combining member 11.

In such a case, in the right combining member 11 arranged on the right of the vehicle to which a collision load is to be input, the outer skeleton portion 11B which extends along the front-back direction transmits the collision load to the rear right tunnel reinforcement 5. Meanwhile, in the left combining member 10 arranged on the left of the vehicle, the inner skeleton portion 10C of which the front portion extends obliquely toward the inside in the vehicle width direction transmits the collision load reliably toward the rear left tunnel reinforcement 5.

Figure 12:
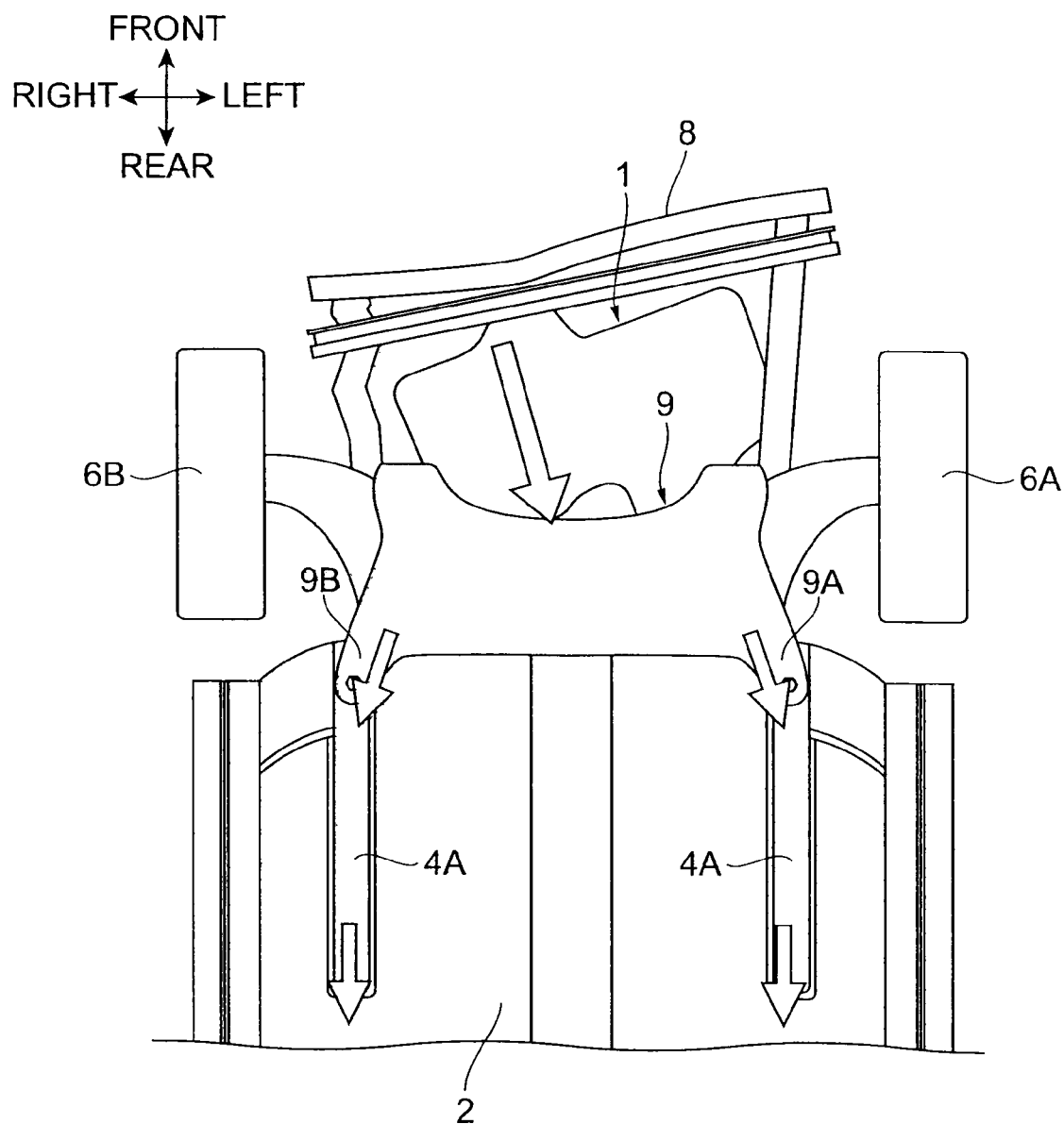
FIG. 12 is a bottom view corresponding to FIG. 11, when a transmission situation of a front collision load in an underbody structure serving as a conventional structure is viewed from the lower side of a vehicle body.

In contrast, in a conventional general underbody structure as shown in FIG. 12, when the power unit 1 collides with the suspension member 9 while being rotationally displaced counterclockwise on the plane of sheet of FIG. 12, the suspension member 9 transmits a collision load, which is to be obliquely input to the central portion of the front portion in the right-and-left direction like a white arrow, toward the rear portions 4A and 4A of the right and left front side members 4 and 4 from the left fastened portion 9A and the right fastened portion 9B of the rear portion.

In this way, when a front collision load of a vehicle is obliquely input to the central portion of the front portion of the suspension member 9 in the right-and-left direction, in the conventional general underbody structure shown in FIG. 12, the front collision load is distributed and obliquely transmitted only in two directions towards the right and left front side members 4 and 4 from the left fastened portion 9A and right fastened portion 9B of the suspension member 9. However, in the underbody structure of the second embodiment shown in FIG. 11, in addition to these two directions, a front collision load is distributed and exactly transmitted also in two directions facing the right and left tunnel reinforcements 5 and 5 from the left combining member 10 and the right combining member 11.

That is, according to the underbody structure of the second embodiment, a front collision load of the vehicle to be input to the front portion of the suspension member 9, including the case where the front collision load of the vehicle is concentrated on one side in the vehicle width direction can be efficiently and distributed and transmitted to the pair of right and left front side members 4 and 4 and the pair of right and left tunnel reinforcements 5 and 5, which are front and back skeleton portions of the underbody, from the rear portion of the suspension member 9. As a result, it is possible to prevent a situation where a front portion of a vehicle interior is crushed due to a front collision load.

Additionally, since a front collision load can be distributed and transmitted to a plurality of front and back skeleton portions in this way, the rigidity of each of the front and back skeleton portions can be secured, and collision safety performance can be improved while suppressing an increase in mass.

Figure 13:
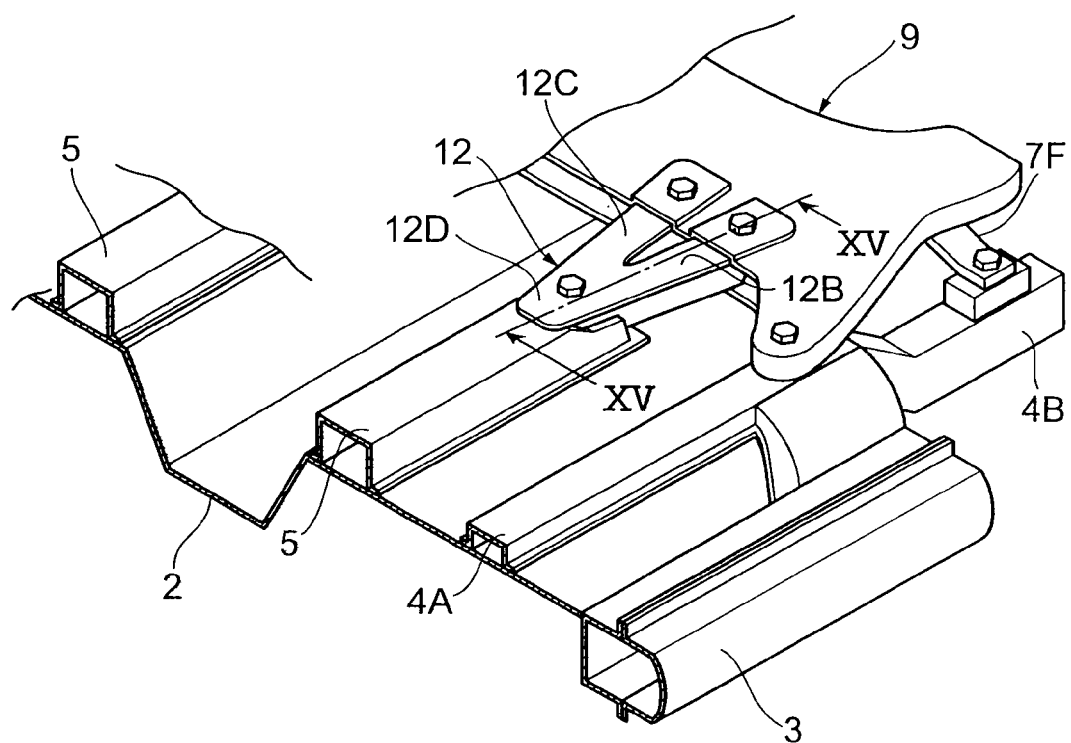
FIG. 13 is a partial perspective view corresponding to FIG. 8, showing a modification of the left combining member and right combining member shown in FIG. 7.

Here, in the underbody structure of the second embodiment, one fan-shaped left combining member 10 shown in FIG. 7 can be changed into the V-shaped left combining member 12 as shown in FIG. 13, and the other fan-shaped right combining member 11 shown in FIG. 7 can be changed into a left combining member (not shown) which is bilaterally symmetric with respect to the left combining member 12 shown in FIG. 13. In addition, the left combining member (not shown) may not necessarily be constructed so as to be bilaterally symmetric with respect to the left combining member 12 shown in FIG. 13.

Figure 14:
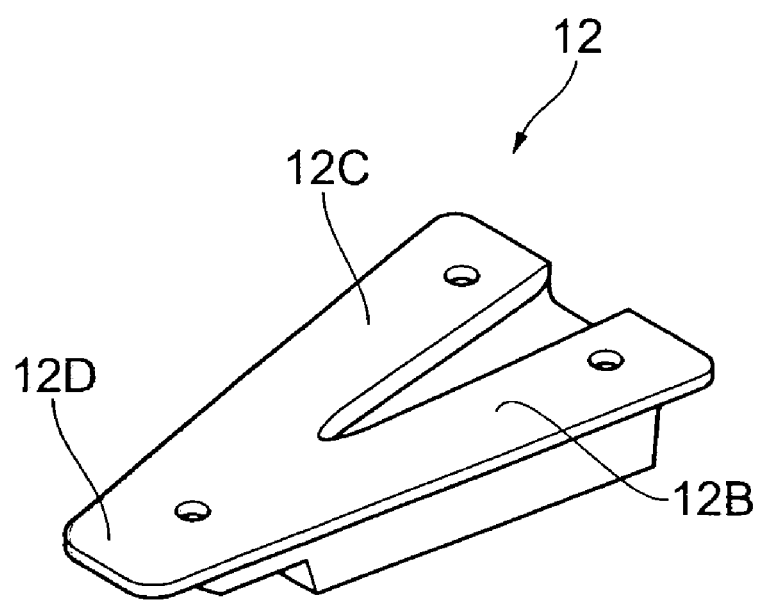
FIG. 14 is an enlarged perspective view of the left combining member shown in FIG. 13.

In the left combining member 12 shown in FIG. 13, the shape of the bottom surface seen from the lower side of the vehicle body is formed in the shape of the letter V as shown in FIG. 14. The outer portion of the left combining member 12 in the vehicle width direction is formed with the outer skeleton portion 12B, and the outer portion thereof in the vehicle width direction is formed with an inner skeleton portion 12C. Additionally, the rear end of the left combining member 12 in the front-back direction of the vehicle body is formed with a rear skeleton portion 12D.

Figure 15:
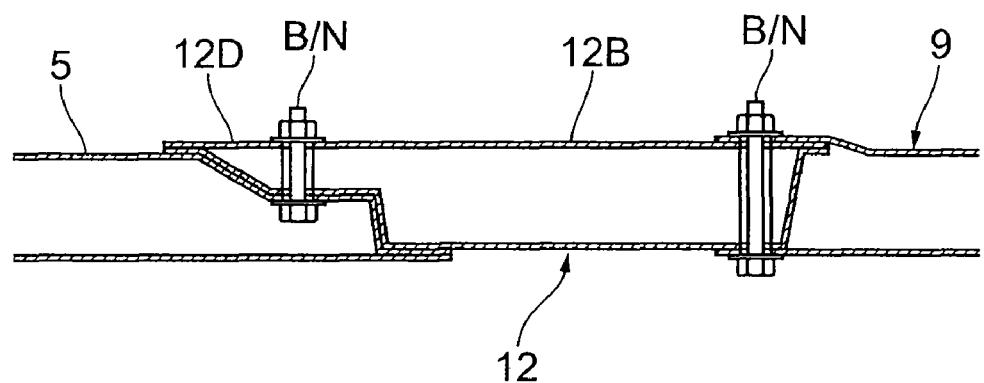
FIG. 15 is a partial longitudinal cross-section along a line XV-XV of FIG. 13.

Here, as shown in FIG. 15, the outer skeleton portion 12B of the left combining member 12 is formed in a hollow cross-section which has large vertical spacing, and the rear skeleton portion 12D of the left combining member 12 is formed in a stepped hollow cross-section which has small vertical spacing. In addition, although not shown, the inner skeleton portion 12C of the left combining member 12 is formed in a hollow cross-section which has large vertical spacing, similarly to the outer skeleton portion 12B.

As shown in FIG. 13, in such a V-shaped left combining member 12, the rear skeleton portion 12D of the rear end is fastened to the tunnel reinforcements 5 via the bolt/nut B/N, and mutually separated front ends in the outer skeleton portion 12B and the inner skeleton portion 12C are fastened to the rear portion of the suspension member 9 via the bolt/nut B/N.

The underbody structure related to the invention is not limited to the aforementioned first embodiment or second embodiment. For example, a combined structure of the subframe (suspension member) 7 with a frame structure as shown in FIG. 1, and the pair of right and left combining members 10 and 11 of a shape as shown in FIG. 7 may be adopted.

The invention claimed is:

1. An underbody structure of a vehicle comprising:
   a suspension member capable of transmitting a collision load to be input from the front of the vehicle rearward;
   tunnel reinforcements arranged in a vehicle width direction, the tunnel reinforcements are arranged on an inner side of the suspension member in a vehicle width direction,
   wherein a rear portion of the suspension member is engaged with a pair of right and left side members and a pair of right and left tunnel reinforcements of a vehicle body at four points in a vehicle width direction.

2. The underbody structure according to claim 1, wherein the suspension member is face-plate-shaped.

3. The underbody structure according to claim 1, wherein the suspension member is frame-shaped, and has therein load transmission beams which are developed and extend in the shape of a fan to the front of the vehicle body.

4. The underbody structure according to claim 1, further comprising a fan-shaped combining member of which a front portion on the side of the suspension member spreads in the vehicle width direction, as a member which combines a rear portion of the suspension member with at least the tunnel reinforcements.

5. The underbody structure according to claim 1, further comprising a V-shaped combining member of which a front portion on the side of the suspension member opens and branches in the vehicle width direction, as a member which combines a rear portion of the suspension member with at least the tunnel reinforcements.

6. The underbody structure according to claim 4, wherein the combining member has an outer skeleton portion which is formed at an outer portion in the vehicle width direction, and extends in the front-back direction of the vehicle body, and an inner skeleton portion which is formed at an inner portion in the vehicle width direction, and has a front portion extending obliquely toward the inside in the vehicle width direction.

7. The underbody structure according to claim 6, wherein the front portion of the inner skeleton portion extends obliquely forward toward a region covering one side of right and left sides from a central portion of the front portion of the vehicle body in the right-and-left direction.

8. An underbody structure comprising:
   a collision load transmission member which receives a front collision load of a vehicle to be input to a power unit disposed at a front portion of the vehicle, and transmits the front collision load to a plurality of front and back skeleton portions disposed at an underbody,
   wherein the collision load transmission member includes at least three load receiving points which receive the front collision load of the vehicle from both side portions and an intermediate portion of the power unit in a vehicle width direction, and
   has at least three load transmission points arranged inside side members of the vehicle in the vehicle width direction.

9. The underbody structure according to claim 8, wherein the collision load transmission member has at least four load transmission points for transmitting a front collision load to at least four front and back skeleton portions disposed at both side portions and an intermediate portion of the underbody in the vehicle width direction.

10. The underbody structure according to claim 9, wherein the collision load transmission member has a plurality of load transmission paths for distributing and transmitting a front collision load to at least two points of the load transmission points from each of the load receiving points.

11. The underbody structure according to claim 8, wherein the collision load transmission member is constituted as a suspension member or sub-frame of the underbody, and the front and back skeleton portions are constituted as front side members, side sills, and tunnel reinforcements of the underbody.

12. The underbody structure according to claim 1,
wherein the suspension member is a frame body, and has therein at least load transmission beams which extend outward to the front.

13. The underbody structure according to claim 1,
wherein the suspension member is a frame body, and has therein at least load transmission beams which extend outward to the front of the vehicle body, and rear ends of the load transmission beams are combined at positions corresponding to the tunnel reinforcements.

14. The underbody structure according to claim 5,
wherein the combining member has an outer skeleton portion which is formed at an outer portion in the vehicle width direction, and extends in the front-back direction of the vehicle body, and an inner skeleton portion which is formed at an inner portion in the vehicle width direction, and has a front portion extending obliquely toward the inside in the vehicle width direction.

15. The underbody structure according to claim 14,
wherein the front portion of the inner skeleton portion extends obliquely forward toward a region covering one side of right and left sides from a central portion of the front portion of the vehicle body in the right-and-left direction.

* * * * *